UNITED STATES PATENT OFFICE 2,104,009

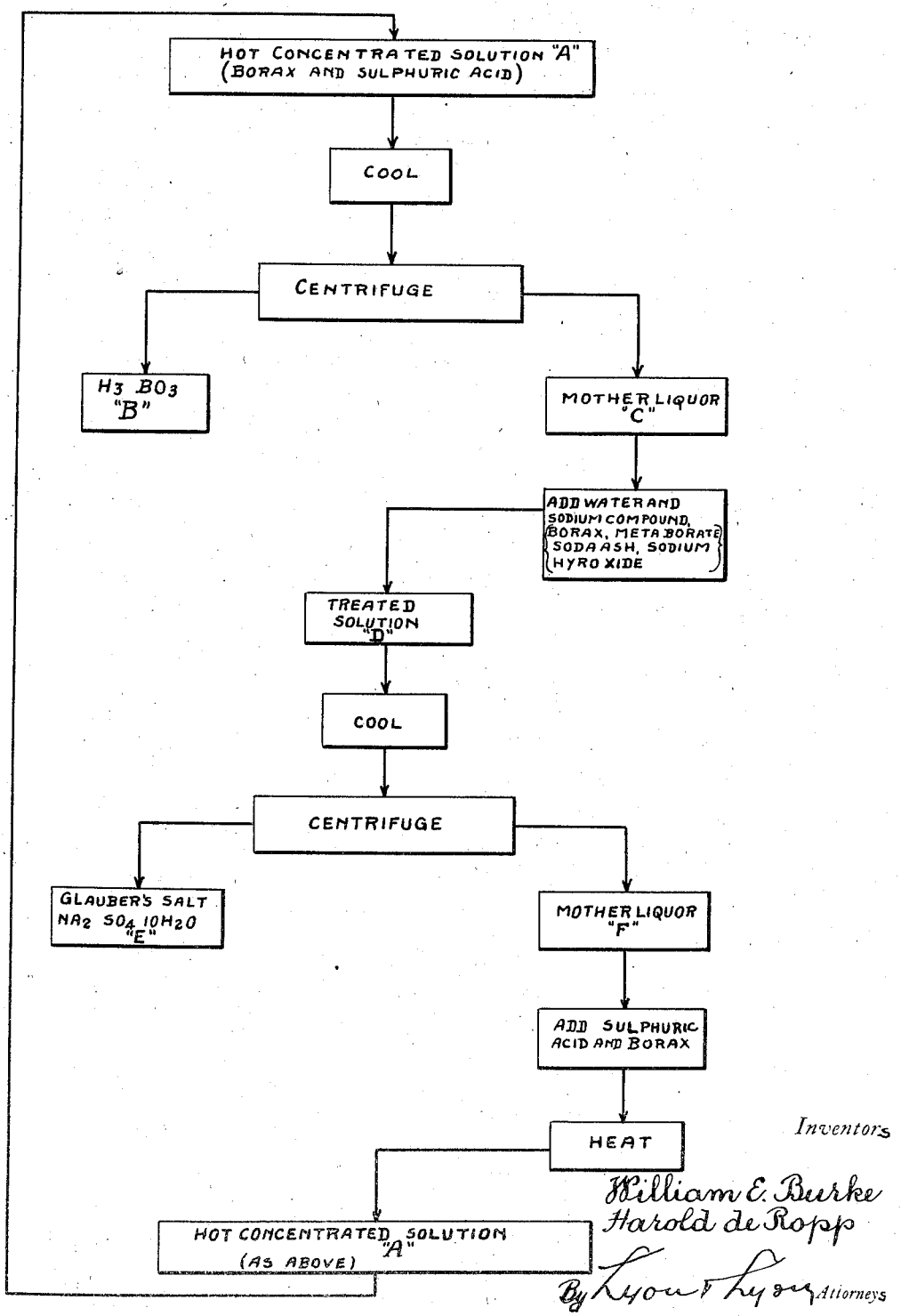

PROCESS FOR THE MANUFACTURE OF BORIC ACID

William E. Burke, Trona, Calif., and Harald de Ropp, Charleston, W. Va., assignors to American Potash & Chemical Corporation, Trona, Calif., a corporation of Delaware Application June 25, 1929, Serial No. 373,639½

19 Claims. (Cl. 23—149)

The invention relates to improvements in the manufacture of boric acid from certain metal borates. In particular this invention relates to an economical and efficient cyclical process for producing boric acid from such metal borates as produce upon reaction with sulphuric acid a soluble sulphate and boric acid. The invention includes improvements in a cyclical process and in certain novel steps thereof.

When borax, the most common metal borate is treated with sulphuric acid, the reaction products are boric acid, sodium sulphate and water, as illustrated by the following type equation:

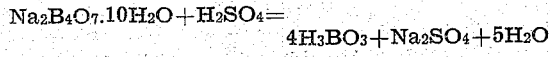

$$Na_2B_4O_7 \cdot 10H_2O + H_2SO_4 = 4H_3BO_3 + Na_2SO_4 + 5H_2O$$

The process of the present invention is hereafter described in terms of sodium tetraborate, for the reason that this material occurs most abundantly in nature and is well suited to the herein described process. However, any suitable metal borate such as Ulexite, Razorite and Boracite, or mixtures of two or more borates, capable of fulfilling the conditions specified within this invention may be employed.

Referring to the preceding reaction equation, if just sufficient water is present to keep the sodium sulphate in solution, a considerable part of the resulting boric acid may be recovered as a crystalline precipitate, for example, by cooling, due to the low solubility of the boric acid as compared with that of the sodium sulphate. However, the boric acid which remains in solution constitutes a serious loss if the remaining solution is discarded. Attempts to recycle the remaining solution through the operation, in order to secure more complete recovery of boric acid, have encountered several difficulties; for example, water formed in the reaction progressively increases the volume of the circulating solution, and the progressive increase in the amount of sodium sulphate present results in contamination of the boric acid produced with sodium sulphate.

This application is a continuation in part of copending application Serial No. 207,614 filed July 22, 1927.

It is the general object of the present invention to provide a process in which sodium sulphate may be recovered from the solution to be recirculated whereby the progressive increase in the amount of sodium sulphate present in the solution is avoided and a pure boric acid produced, while at the same time the boric acid content of the solution remaining after precipitation of the boric acid therefrom is recovered.

The present invention comprehends that a solution containing sodium pentaborate, that is, a mixture of borax and boric acid, will hold more boric acid or boron than either a solution of borax or boric acid at the same temperature. Accordingly, after the solution of boric acid, produced from the reaction between borax and sulphuric acid, is cooled to precipitate boric acid and brought nearly to the saturation point with respect to the sodium sulphate present, part of the sodium sulphate content may be precipitated from the solution without further precipitation of boric acid or boron compounds, provided a portion of the boric acid of the solution is first converted to the pentaborate. When the boric acid of such a solution is neutralized and converted into more alkaline compounds, such as the pentaborate and the tetraborate, the solution is no longer saturated with respect to the boric acid originally present and may be cooled with resultant precipitation of sodium sulphate without loss of the valuable boron content.

The solubility of boron compounds in solution increases so markedly as the boric acid is converted in part to the pentaborate or further to a mixture of the pentaborate and the tetraborate that the solution may be rendered unsaturated with respect to the boric acid originally present by adding such metal boron compounds as are capable of causing neutralization of the boric acid. Thus a solution saturated with respect to boric acid is rendered unsaturated by adding thereto any suitable metal borate. Any sodium boron compound containing more sodium content than the pentaborate may be added for this purpose, i. e., borax or sodium metaborate may be employed as conditions warrant.

It has also been found economical under certain circumstances to employ alkalis or alkali salts, which contain no boron, for the purpose of neutralization. Any of the common reagents capable of providing sufficient hydroxyl ions for the neutralization or partial neutralization of the boric acid may be used provided that they introduce no permanent undesirable materials into the solution. Of the latter class of compounds, are the carbonates, the oxides and hydroxide of sodium. The pentaborate is formed from these different materials in accordance with the following reactions:

(1) $6H_3BO_3 + Na_2B_4O_7 = Na_2B_{10}O_{16} + 9H_2O$
(2) $8H_3BO_3 + Na_2B_2O_4 = Na_2B_{10}O_{16} + 12H_2O$
(3) $10H_3BO_3 + Na_2CO_3 = Na_2B_{10}O_{16} + 15H_2O + CO_2$
(4) $10H_3BO_3 + 2NaOH = Na_2B_{10}O_{16} + 16H_2O$

As will be apparent from an inspection of Equation (1), where borax is used to form the pentaborate 40% of the boron content results from the borax added. In the case of Equations (2), (3) and (4), where sodium metaborate, sodium carbonate, and sodium hydroxide are employed, the boron in solutions of Equation (2) is only 20% derived from the metaborate, while all boron in the solutions of Equations (3) and (4) is derived entirely from boric acid.

Whether metal boron compounds or other suitable compounds such as free alkali, as above described, are employed for the partial neutralization of boric acid prior to the removal of the soluble sulphate depends largely upon economic considerations. The yield of boric acid per cycle of the present process is dependent upon the quantity of sodium sulphate which may be removed subsequent to the precipitation of the essentially pure boric acid. The quantity of sulphate removed is dependent upon the temperature to which the liquor may be cooled for its precipitation, without causing simultaneous precipitation of valuable boron compounds. By the use of suitable boron-free neutralizing agents in the step of partial neutralization of boric acid, the resulting solution contains less boron, hence lower cooling temperatures may be tolerated, with a resulting larger yield per cycle of boric acid than when boron-containing neutralizing agents are employed. Hence in localities where alkalis, e. g., NaOH and $Na_2CO_3$ are cheap it may be advisable to employ these in place of borax.

A larger yield per cycle is obtained, thereby decreasing production costs from the standpoint of efficiency of time, labor and equipment requirements, etc. Offsetting such advantages are the disadvantages of the cost of the boron-free alkali employed and the acid required for its subsequent neutralization.

In localities where such materials are relatively expensive it may be advisable to employ boron-containing alkalis, e. g. borax or sodium metaborate, with a resulting lesser yield per cycle.

The complete process of the present invention comprises the following successive steps: 1, treating a solution including sodium tetraborate with sulphuric acid to form boric acid and sodium sulphate; 2, separating boric acid from the resulting solution; 3, neutralizing a portion of the residual boric acid, after separation of boric acid; and 4, separating sodium sulphate and water from the resulting solution; with return of the solution remaining after separation of sodium sulphate to the first step.

The invention thus provides an improved cyclic process which includes the removal of water and sodium sulphate formed in the operation enabling the maintenance of uniform operating conditions in the cycle. The invention also provides for substantially complete recovery of the boric acid free from contamination with sodium sulphate.

In carrying out the present invention, under such conditions that the use of borax

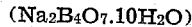
$(Na_2B_4O_7.10H_2O)$ is preferred, a solution containing sodium tetraborate is treated with sulphuric acid. The resulting solution is then cooled to a temperature slightly higher than that at which the separation of sodium sulphate begins with consequent crystallization of a large proportion of the boric acid formed by the reaction between the sulphuric acid and the sodium tetraborate. This crystallized boric acid is then separated from the solution, for example, in a centrifuge.

The remaining solution is saturated with respect to boric acid, nearly saturated with respect to sodium sulphate, and contains all of the sodium sulphate and water formed in the reaction between the sulphuric acid and sodium tetraborate. If this solution is further cooled, sodium sulphate, in the form of dekahydrate, and boric acid are precipitated together.

In carrying out this invention, however, sodium tetraborate is added to the solution before separation of sodium sulphate. The solution, with added sodium tetraborate, is then further cooled with consequent crystallization of sodium sulphate, and this crystallized sodium sulphate is then separated from the solution, for example, in a centrifuge. The increase in the solubility of boric acid effected by the addition of sodium tetraborate makes it possible to remove sodium sulphate in this manner without loss of boric acid. This further cooling is carried to a temperature slightly higher than that at which further separation of boric acid from the solution begins.

In the cyclic operation of the invention, an amount of sodium sulphate corresponding to that formed is removed in this manner in each cycle. This removal of sodium sulphate as the dekahydrate consequently effects the removal from the circulating solution of an amount of water twice that formed by the reaction between the sulphuric acid and sodium tetraborate dekahydrate. It is advantageous to add water to the circulating solution, to maintain its volume, after the separation of boric acid and before further cooling of the solution for separation of sodium sulphate. This further assists in preventing loss of boric acid and permits a more effective separation of sodium sulphate.

The solution remaining after separation of sodium sulphate, in carrying out the invention, contains residual sodium sulphate and boric acid and is returned to the first step of the operation in which, together with added sodium tetraborate, it is subjected to treatment with sulphuric acid and the operation repeated.

While the improved cyclic process of the invention can be carried out over a wide range of temperature and concentration conditions, the example of operation given below represents a particularly advantageous one. In any case, the operation is advantageously carried out so that the boric acid and sodium sulphate formed in each cycle are completely separated in the same cycle. Increase in the quantity of boric acid produced in the reaction between sulphuric acid and sodium tetraborate, per cycle, also involves a corresponding increase in the production of sodium sulphate, and this limits the temperature to which the resulting solution can be cooled before contamination of the crystallized boric acid with sodium sulphate begins. As the temperature to which the solution is cooled rises, an increasing amount of boric acid remains in the solution so that further cooling for separation of sodium sulphate is in turn limited by the increased tendency of boric acid to separate with the sodium sulphate in this subsequent operation. The operation is thus advantageously carried out under conditions such that the maximum amount of sodium sulphate is separated, per cycle, without loss of boric acid with the sodium sulphate.

The best yield per cycle of boric acid free from contamination with sodium sulphate is obtained when the initial cooling for separation of boric acid is carried to the lowest temperature possible before the separation of sodium sulphate begins and when further cooling of the remaining solution after the addition of sodium tetraborate for the separation of sodium sulphate is carried to the lowest temperature possible before the separation of boric acid begins again. Under practical conditions of operation, it is usually advisable to allow a slight temperature margin in each of these cooling operations to prevent contamination of the boric acid with sodium sulphate and to prevent loss of boric acid. A temperature margin of say 1.5° C. may be allowed, for example, but this may be increased or decreased as the operating conditions warrant with accompanying decrease or increase in the yield per cycle.

The following example will further illustrate the invention, the description referring to the accompanying drawing, in which The figure is a flow sheet of the process.

The solution F recycled from a previous operation, contained about 10.1 lbs. of boric acid, 2 lbs. of sodium tetraborate, 33.3 lbs. of sodium sulphate and 100 lbs. of water. This solution was at a temperature of about 24.2° C. To this solution about 17.4 lbs. of sodium tetraborate dekahydrate and 5.44 lbs. of 100% sulphuric acid were added. The resulting solution (A) contained about 23.9 lbs. of boric acid, 41.2 lbs. of sodium sulphate and 103.2 lbs. of water. This solution was cooled to about 27.7° C. and about 13.8 lbs. of crystallized boric acid separated. The remaining solution (C) contained about 10.1 lbs. of boric acid, 41.2 lbs. of sodium sulphate and 103.2 lbs. of water. To this solution were added about 3.8 lbs. of sodium tetraborate dekahydrate and 5 lbs. of water. The resulting solution (D) contained about 10.1 lbs. of boric acid, 2.0 lbs. of sodium tetraborate, 41.2 lbs. of sodium sulphate and 110 lbs. of water. This solution was cooled to about 24.2° C. and about 17.9 lbs. of crystallized sodium sulphate dekahydrate separated. The remaining solution contained about 10.1 lbs. of boric acid, 2.0 lbs. of sodium tetraborate, 33.3 lbs. of sodium sulphate and 100 lbs. of water. The operation was then repeated with this solution.

The foregoing illustrative example represents an operation carried out with pure materials, $Na_2B_4O_7.10H_2O$ and $H_2SO_4$. It will be understood that different borate materials and various impurities may make different changes in the operation desirable.

In any event, however, the solution resulting from treatment of the metal borate with sulphuric acid is best cooled as far as possible before the separation of the soluble sulphate begins, and the remaining solution after separation of crystallized boric acid and partial neutralization of the residual boric acid is best further cooled as far as possible before further separation of boric acid begins.

As pointed out above, it is advantageous to separate as much sodium sulphate as possible, per cycle, without loss of boric acid. To this end, it is advantageous to supply to the treatment with sulphuric acid a dehydrated or partially dehydrated borax, that is sodium tetraborate with less water of crystallization than corresponds to the dekahydrate.

By supplying dehydrated or partially dehydrated borax to the sulphuric acid treatment, the volume of the resulting solution (A) may be reduced with consequent increase in the proportion of boric acid precipitated on cooling this solution. With the separation of an increased proportion of the boric acid, an increased amount of water may be added to the solution before separation of sodium sulphate to maintain its volume, and due to the reduced amount of boric acid in the resulting solution it may then be cooled to a lower temperature before the separation of boric acid again begins, making possible the separation of an increased amount of sodium sulphate. In this manner, the amount of sodium sulphate in the recycled solution may be reduced, making it possible to use increased amounts of sodium tetraborate and sulphuric acid in each cycle with consequent increase in the yield per cycle of boric acid while nevertheless maintaining uniform operating conditions in the cycle.

In place of borax, sodium tetraborate dekahydrate, for example, it is advantageous to use sodium tetraborate pentahydrate, sodium tetraborate tetrahydrate, or totally dehydrated sodium tetraborate in the process. Sodium tetraborate pentahydrate may be produced, for example, by crystallization above the transition point from hot concentrated borax solutions. Sodium tetraborate tetrahydrate occurs in certain natural deposits and may be produced by crystallization under suitable conditions of elevated temperature and pressure. By the use of sodium tetraborate pentahydrate, the yield per cycle of boric acid may be increased as much as 28%, as compared to the yield per cycle using sodium tetraborate dekahydrate, ordinary borax. The use of totally dehydrated sodium tetraborate makes it possible to increase the yield per cycle of boric acid as much as 57%.

Referring to the sodium tetraborate added to the solution remaining after initial cooling and separation of boric acid, it is unimportant whether borax or dehydrated or partially dehydrated borax is used since water is added to the solution circulating in the cycle at this point in the operation. In case that totally dehydrated borax is employed in the sulphuric acid treatment, it becomes necessary to add slightly more, say 10% more borax, to the solution C for the preparation of solution D, than in the case where dekahydrate borax is employed.

A similar improvement in the operation may be obtained by evaporation of water from the solution recycled in the process, either before or after the further addition of sodium tetraborate and sulphuric acid. The solution A containing added sodium tetraborate and sulphuric acid is ordinarily heated to promote the reaction, and this operation may be conveniently combined with an evaporating operation. Or, cooling of the solution A resulting from the treatment of sodium tetraborate with sulphuric acid may be promoted or in part effected by evaporation under subatmospheric pressure.

In this way, an increase in concentration of the solution from which boric acid is separated, with improved results similar to those where this water is eliminated by using dehydrated or partially dehydrated borax is obtained. Such removal of water by evaporation also makes it possible to carry this concentration further than is possible simply by eliminating water of crystallization from the sodium tetraborate supplied to the operation.

In carrying out the invention under such economic conditions that the use of free alkali as a neutralizing agent is preferable, the process as hereinbefore set forth by example may be carried out in an entirely similar fashion. The following example will illustrate the operation of the process of this invention wherein partial neutralization is brought about by the addition of caustic soda.

While this feature may be employed in any one of a number of the possible variations of the present process, the following example is chosen as nearly parallel to the one preceding as possible, in order to show, most clearly, the valuable increase in yield per cycle which may be obtained by such procedure.

The solution, F, recycled from a previous operation contained about 9.0 lbs. of boric acid, 1.8 lbs. of sodium tetraborate, 27.8 lbs. of sodium sulphate and 100 lbs. of water. This solution was at a temperature of about 22.3° C. To this solution about 46.7 lbs. of sodium tetraborate dekahydrate and 12.9 lbs. of 100% sulphuric acid were added. The resulting solution A, contained about 41.5 lbs. of boric acid, 46.4 lbs. of sodium sulphate and 110.2 lbs. of water. This solution was cooled to about 28.5° C. and about 30.3 lbs. of crystallized boric acid separated by means of a centrifugal machine. The remaining solution, C, contained about 11.2 lbs. of boric acid, 46.4 lbs. of sodium sulphate and 110.2 lbs. of water. To this solution were added about 0.71 lb. of 100% equivalent sodium hydroxid dissolved in 12.3 lbs. of water. The resulting solution D, contained about 9.0 lbs. of boric acid, 1.8 lbs. of sodium tetraborate, 46.4 lbs. of sodium sulphate and 123.6 lbs. of water. This solution was cooled to about 22.3° C. and about 42.3 lbs. of crystallized sodium sulphate dekahydrated, (Glauber salt), separated. The remaining solution contained about 9.0 lbs. of boric acid, 1.8 lbs. of sodium tetraborate, 27.8 lbs. of sodium sulphate and 100.0 lbs. of water. The operation was repeated with this solution.

The preceding example clearly shows that more than twice as much boric acid may be produced per cycle by the use of free alkali as compared with the identical process employing borax for partial neutralization of the boric acid, prior to cooling for the removal of the hydrated sulphate. The temperature factors of safety, i. e., the temperature difference between the point of saturation and the point of cooling, were even greater in the latter case than in the former.

Whatever be the nature of the neutralizing agent employed is of little consequence to the scope of the present invention; the selection being entirely one of economic consideration. The addition of any reagent suited to the purpose of partially neutralizing the boric acid prior to separation of the soluble sulphate is an important part of the present invention providing an improved cyclical process as herein set forth. Particularly, greater amounts of caustic may be used than in the foregoing examples, and the solution may be brought to saturation with pentaborate and borax rather than saturation with pentaborate and boric acid.

As the yield per cycle is increased the solubility limits of both the raw material, borate, and the product, boric acid, are approached. It is desirable to have all the borate in solution prior to the precipitation of boric acid, in order to prevent contamination of the product, boric acid, with unreacted borate. Also in many cases it is desirable to filter the solution prior to the precipitation of boric acid.

The borate employed often contains undesirable foreign matter. To filter such material therefrom it is necessary that the borate be entirely in solution. In certain cases in the past, the factor limiting the quantity of boric acid that might be produced depended upon the quantity of boric acid which might be held in solution at the temperature most suited to filtering operations.

However, by the process of this invention this limiting factor has been overcome. This invention comprehends that a solution containing pentaborate, that is a mixture of borax and boric acid will contain a much greater quantity of boron than either a solution of borax or boric acid at the same temperature. Hence it is preferred that the reaction solution, A, be prepared by adding thereto the desired quantity of borax or other suitable borate, together with approximately 40% of the total acid required. The resulting solution containing a mixture of boric acid and borax easily contains the total boron of the system in solution at a relatively low temperature.

Consequently the resulting solution may easily be filtered for removal of extraneous solid matter. The remaining acid is then added prior to the cooling operation for the removal of boric acid. It is not necessary that the whole of the boric acid crop produced by the addition of the remaining acid be soluble at the temperature of the reaction. Since the borate material is completely dissolved by this novel process, danger of occlusions thereof with the precipitating boric acid is eliminated. Obviously this feature of the present invention is of great value in the economical and efficient manufacture of boric acid from suitable borate materials.

In addition to the aforementioned advantages, the production of the pentoborate liquor during the operation of preparing the reaction solution A, is further efficient. Where cooling is carried out in coil coolers, i. e. by means of indirect heat transfer, a coating of boric acid is deposited upon said coils, or their equivalent. This deposit is dfficult of solution. In the past it has been the practice to remove such deposits by means of hot water, thereby entailing a loss of valuable boric acid. The strong pentaborate liquor of the present invention has been found to have a remarkable affinity for such deposits of boric acid; the rate of solution of the deposited material in the hot, semi-complete reaction liquor containing a large amount of pentaborate being very considerably greater than in the hot water previously employed. Beside the advantage of time and ease of operation gained thereby, the valuable boric acid is caused to remain within the system and may be recovered with the boric acid produced in the cycle, upon subsequent cooling. The advantages as shown above may be combined, that is, the hot strong pentaborate liquor may be first utilized for the dissolution of deposited boric acid, then passed through a filter for the removal of foreign matter, or vice versa. Hence, this feature of the present invention is of great practical value.

Throughout the preceding description of the novel and valuable process of this invention the examples and exposition have been largely given in terms of common borax. It must be understood that the other borate materials are also of value to the process, providing such borates yield in whole or in part a soluble sulphate upon treatment with sulphuric acid.

For instance, the bimetal borate Ulexite or Cotton Ball may be advantageously employed. Ulexite is a double borate of calcium and sodium. Upon appropriate treatment with sulphuric acid, sodium sulphate, calcium sulphate and boric acid are formed. The calcium sulphate so formed being insoluble may be removed by filtration or other suitable means and the remaining solution subjected to the process of the present invention as hereinbefore described.

While the acidification of borax has been shown in terms of approximately equivalent quantities of sulphuric acid it is preferred that a slight excess of sulphuric acid be present in the reaction solution A, prior to cooling for precipitation of boric acid. The advantage of this slight excess of strong acid resides in its ability to withhold in solution certain undesirable impurities, such as iron, etc., thereby insuring a boric acid product of satisfactory color.

While the particular processes herein described are well adapted to carry out the objects of the present invention, it is understood that various modifications and changes may be made without departing from the principles of the invention, and this invention covers all such modifications and changes as come within the scope of the appended claims.

We claim:

1. An improved cyclic process of manufacturing boric acid and sodium sulphate, comprising successively treating a solution including sodium tetraborate with sulphuric acid to form boric acid and sodium sulphate, partially crystallizing out boric acid from the resulting solution, adding sodium tetraborate to the solution after separation of boric acid, partially crystallizing out sodium sulphate from the resulting solution, and returning solution remaining after separation of sodium sulphate to the first treatment.

2. An improved cyclic process of manufacturing boric acid and sodium sulphate, comprising successively treating a solution including sodium tetraborate with sulphuric acid to form boric acid and sodium sulphate, partially crystallizing out boric acid from the resulting solution, adding sodium tetraborate and water to the solution after separation of boric acid, partially crystallizing out sodium sulphate from the resulting solution, and returning solution remaining after separation of sodium sulphate to the first treatment.

3. An improved cyclic process of manufacturing boric acid and sodium sulphate, comprising successively treating a solution including sodium tetraborate with sulphuric acid to form boric acid and sodium sulphate, separating water from the solution treated with sulphuric acid, partially crystallizing out boric acid from the resulting solution, adding sodium tetraborate to the solution after separation of boric acid, partially crystallizing out sodium sulphate from the resulting solution, returning solution remaining after separation of sodium sulphate to the first treatment.

4. An improved cyclic process of manufacturing boric acid and sodium sulphate, comprising successively treating a solution in which has been dissolved sodium tetraborate containing less than ten molecules of water of crystallization per molecule of tetraborate with sulphuric acid to form boric acid and sodium sulphate, partially crystallizing out boric acid from the resulting solution, adding sodium tetraborate to the solution after the separation of boric acid, partially crystallizing out sodium sulphate from the resulting solution, and returning solution remaining after separation of sodium sulphate to the first treatment.

5. An improved cyclic process of manufacturing boric acid and sodium sulphate, comprising successively treating a solution including sodium tetraborate with sulphuric acid to form boric acid and sodium sulphate, partially crystallizing out boric acid from the resulting solution, adding sodium tetraborate to the solution after separation of boric acid, partially crystallizing out sodium sulphate from the resulting solution, returning solution remaining after separation of sodium sulphate to the first treatment, maintaining the water content of the solution prior to crystallization of boric acid as low as possible while insuring completion of reaction and increasing the water content after passage of boric acid to the point where the remaining boric acid will remain in the solution during crystallization of the sodium sulphate.

6. An improved cyclic process of manufacturing boric acid and sodium sulphate, comprising treating a solution including sodium tetraborate with sulphuric acid to form boric acid and sodium sulphate, cooling the resulting solution to a temperature just above that at which the crystallization of sodium sulphate begins and separating the crystallized boric acid, adding sodium tetraborate to the solution after separation of boric acid, cooling the resulting solution to a temperature just short of that at which separation of boric acid again begins and separating the crystallized sodium sulphate, and returning solution remaining after separation of sodium sulphate to the first treatment.

7. An improved cyclic process of manufacturing boric acid and sodium sulphate, comprising treating a solution including sodium tetraborate with sulphuric acid to form boric acid and sodium sulphate, cooling the resulting solution to a temperature just above that at which the crystallization of sodium sulphate begins and separating the crystallized boric acid, adding sodium tetraborate and water to the solution after separation of boric acid, cooling the resulting solution to a temperature just short of that at which separation of boric acid again begins and separating the crystallized sodium sulphate, and returning solution remaining after separation of sodium sulphate to first treatment.

8. In the manufacture of boric acid and sodium sulphate, the improvement which comprises partially crystallizing out boric acid from a solution containing boric acid and sodium sulphate by cooling, adding sodium tetraborate to the solution remaining after separation of boric acid, and partially crystallizing out sodium sulphate from the resulting solution by further cooling.

9. In cyclic processes of manufacturing boric acid and sodium sulphate, the improvement which comprises partially crystallizing out sodium sulphate from the solution circulating in the cycle after separation of boric acid and adding sodium tetraborate to the circulating solution after separation of boric acid and before separation of sodium sulphate to prevent loss of boric acid with the separated sodium sulphate.

10. A process of manufacturing boric acid and sodium sulphate, which comprises treating a solution including sodium tetraborate with sulphuric acid to form boric acid and sodium sulphate, partially crystallizing out boric acid from the resulting solution, treating the solution with a sodium containing compound capable of increasing the solubility of boric acid and partially crystallizing out sodium sulphate from the solution.

11. A process of manufacturing boric acid and sodium sulphate, which comprises treating a solution including sodium tetraborate with sulphuric acid to form boric acid and sodium sulphate, partially crystallizing out boric acid from the resulting solution, treating the solution with a sodium containing compound capable of increasing the solubility of boric acid, and partially crystallizing out sodium sulphate from the solution, and returning the solution remaining after the latter separating operation to the first treating operation.

12. A process of manufacturing boric acid and sodium sulphate which comprises treating a solution including a sodium borate with sulphuric acid to form boric acid and sodium sulphate, cooling the solution to partially precipitate boric acid, then treating the solution with a sodium compound capable of increasing the solubility of boric acid, and cooling the solution to partially precipitate sodium sulphate.

13. A process of manufacturing boric acid and sodium sulphate which comprises treating a solution including a sodium borate with sulphuric acid to form boric acid and sodium sulphate, cooling the solution to partially precipitate boric acid, then treating the solution with a sodium compound capable of increasing the solubility of boric acid, and cooling the solution to partially precipitate sodium sulphate, and treating the remaining solution and additional sodium borate with further sulphuric acid.

14. In the process of manufacture of boric acid and sodium sulphate, the steps comprising treating a sodium containing borate material with sulphuric acid in amounts sufficient to form a solution nearly saturated with pentaborate, filtering the solution, then treating the solution with additional sulphuric acid necessary to form boric acid, cooling the solution to partially precipitate the boric acid, then treating the solution with a sodium compound capable of converting the remaining acid to the pentaborate, and cooling the solution to partially precipitate soluble sulphates.

15. A process of manufacturing boric acid and sodium sulphate which comprises bringing a sodium borate material into solution in the presence of sulphuric acid to produce boric acid, cooling the solution to partially precipitate boric acid therefrom and separating said boric acid from the solution, then treating the solution with sodium compound capable of increasing the solubility of boric acid, cooling the solution to partially precipitate sodium sulphate, separating the sodium sulphate from the solution, and recycling the solution to the first operation.

16. A process of manufacturing boric acid and a by-product salt, which comprises treating a solution containing sodium borate with a mineral acid to form boric acid and a by-product salt, partially crystallizing out boric acid from the resulting solution, treating the solution with a sodium containing compound capable of increasing the solubility of boric acid and partially crystallizing out said by-product salt from the solution.

17. A process of producing boric acid and sodium sulphate, which comprises treating a solution including a sodium borate with sulphuric acid to form boric acid and sodium sulphate, partially crystallizing out boric acid from the resulting solution, treating the solution with a sodium containing compound capable of increasing the solubility of boric acid and partially crystallizing out sodium sulphate from the solution.

18. In a process of treating solutions containing boric acid and a salt of a strong mineral acid, the steps comprising adding a sodium containing compound capable of increasing the solubility of boric acid and partially crystallizing out said salt from solution.

19. The method of separating sodium sulphate from boric acid which comprises treating a solution containing sodium sulphate and boric acid with a sodium containing compound capable of increasing the solubility of the boric acid, and crystallizing sodium sulphate from the solution.

WILLIAM E. BURKE.
HARALD DE ROPP.